United States Patent
Van Endert et al.

(10) Patent No.: US 7,715,289 B2
(45) Date of Patent: May 11, 2010

(54) OPTIMAL POWER CONTROL

(75) Inventors: Tony Petrus Van Endert, Eindhoven (NL); Gerard Elise Noel Schreurs, Eindhoven (NL)

(73) Assignee: Koninklijke Phililps Electronics N.V., Eindhoven (NL)

( * ) Notice: Subject to any disclaimer, the term of this patent is extended or adjusted under 35 U.S.C. 154(b) by 765 days.

(21) Appl. No.: 11/568,711

(22) PCT Filed: May 4, 2005

(86) PCT No.: PCT/IB2005/051462

§ 371 (c)(1), (2), (4) Date: Nov. 6, 2006

(87) PCT Pub. No.: WO2005/109418

PCT Pub. Date: Nov. 17, 2005

(65) Prior Publication Data
US 2008/0008063 A1    Jan. 10, 2008

(30) Foreign Application Priority Data
May 12, 2004   (EP)   .................... 04102051

(51) Int. Cl.
G11B 7/00   (2006.01)
(52) U.S. Cl. .................... 369/47.5; 369/116; 369/59.11
(58) Field of Classification Search .............. None
See application file for complete search history.

(56) References Cited

U.S. PATENT DOCUMENTS

| | | | |
|---|---|---|---|
| 5,978,335 A | 11/1999 | Clark et al. | |
| 6,181,662 B1 | 1/2001 | Krieger et al. | |
| 7,133,337 B2 * | 11/2006 | Miyaki | 369/47.5 |
| 2001/0051033 A1 | 12/2001 | Yoshida et al. | |
| 2003/0053388 A1 | 3/2003 | Ogawa | |
| 2003/0156513 A1 | 8/2003 | Tseng et al. | |

FOREIGN PATENT DOCUMENTS

| | | |
|---|---|---|
| EP | 1383117 A2 | 1/2004 |
| WO | 03065357 A2 | 8/2003 |

OTHER PUBLICATIONS

Written Opinion of the International Searching Authority PCT/IB2005/051462.

* cited by examiner

*Primary Examiner*—Muhammad N. Edun

(57) ABSTRACT

The present invention relates to determining an optimized write power used for writing electronic data on optical disc and includes a method, a device and a computer program product for determining a write power for writing electronic data on a medium (32, 108), based on a sequence of written data, using a power control model, which includes a written data deviation measure, a written data asymmetry and a written data asymmetry target value, the method comprising the steps determining the written data deviation measure for the sequence of written data (step 202), adjusting the written data asymmetry target value in relation to the written data asymmetry, if the written data deviation measure has changed (steps 218, 220, 226, 228), determining the write power in dependence on written data asymmetry (step 210), and writing another sequence of data on the medium using said determined write power (step 212), so as to obtain power optimized writing of data.

21 Claims, 3 Drawing Sheets

OPTIMAL POWER CONTROL

FIELD OF THE INVENTION

The present invention relates to determining an optimized write power used for writing electronic data on optical discs.

BACKGROUND OF THE INVENTION

In order to achieve good performance during reading and writing on an optical disc, calibration management is undertaken during the reading and writing process. Parameters such as write power, tilt, and focus offset, to mention a few, can be optimized. These parameters are dependent on both the temperature and the actual disc. Temperature variations lead to changes of the wavelength of lasers used and disc variations can cause parameter variations in the radial direction of the disc.

Optical dye discs are very sensitive to above-mentioned changes due to narrow margins for these types of discs.

In order to provide a continuous optimal write power, determining an asymmetry parameter, such as beta, is used. This parameter is chosen as it is linear with respect to the laser write power. This linearity is used to determine the regulation direction of the write power.

The jitter or Bit Error Rate (or Block Error Rate, Bler) is parabolic with respect to write power, which disables using this parameter alone to determine regulation direction of the write power.

Beta will thus be determined and this determining is performed at certain moments in time of parts already written. Typically after having written an amount of electronic data the beta value is determined. This determined value is then compared with a certain beta target reference value and the difference is calculated. The difference is further translated to a write power correction. This type of procedure of determining a beta related value, compensates for variations in radial direction of the disc and is denoted Walking Optimal Power Control (WOPC).

The international patent application WO 03/065357 A2 discloses a device for scanning a record carrier and a method for controlling a power of a radiation source, which method includes detecting a sense signal from a beam via a sensor and controlling the laser power to a desired value in dependence on the sense signal, and comprises correcting the desired value in dependence on a correction signal indicative of local optical properties of the record carrier in dependence on at least one sense signal measured on at least one part of the track near the scanning spot. The sense signals are measured on an empty track and on a written track and correction signals are defined as being dependent on linear combinations of said two sensed signals. These correction signals, dependent on measurements on empty and written tracks, define a correction value for the asymmetry parameter beta.

More generally, when writing electronic data on an optical disc using a Constant Linear Velocity (CLV) procedure, the rotation speed decreases with increasing distance from the disc center, as the data is written on the disc.

For Constant Angular Velocity (CAV) writing the rotational angular speed of the disc remains unchanged as data is written on the disc. Hence the linear (tangential) velocity increases with increasing distance from the center of the disc. For CAV writing the beta target value is therefore dependent on the linear velocity.

When accessing a certain position of the disc, corresponding to a certain overspeed factor, Nx, the beta target value, $\beta t_{Nx}$, can be determined by interpolation between two states having well-known speeds or overspeed factors, Nx_min and Nx_max.

$$\beta t_{Nx} = \beta t_{Nx\_min} + \frac{(Nx_{Ns} - Nx_{min})}{(Nx_{max} - Nx_{min})} \cdot (\beta t_{Nx\_max} - \beta t_{Nx\_min}) \quad (1)$$

The speed at the current position Ns is $Nx_{Ns}$, and the beta target value at $Nx_{max}$ and $Nx_{min}$ are $\beta t_{Nx\_max}$ and $\beta t_{Nx\_min}$, respectively. If for instance, 6x<Nx<8x, then Nxmin=6x and Nxmax=8x.

The beta target value for 6x and 8x may be accurately determined by OPC. By linear interpolation the beta target can be determined at any speed. If however, no OPC can be performed at the outside of the disc, the beta target value can be determined based on beta target values from a table and from OPC at 6x, following equations 2 and 3, for known discs.

$$\Delta\beta = (\beta t_{6x})_{table} - (\beta t_{6x})_{OPC} \quad (2)$$

$$\beta_{t8x} = (\beta t_{8x})_{table} + \Delta\beta \quad (3)$$

For discs that are unknown to the disc drive, information can be read from a pre-groove, a so called ADdress In Pregroove (ADIP), to determine the beta target value at non-PC speeds, compare equations 4 and 5, which are similar to equations 2 and 3, shown above.

$$\Delta\beta = (\beta t_{6x})_{ADIP} - (\beta t_{6x})_{OPC} \quad (4)$$

$$\beta_{t8x} = (\beta t_{8x})_{ADIP} + \Delta\beta \quad (5)$$

The calculation of the beta target value as well as reading and determining the beta target values on the disc, result in beta values that do not take into account the variations among the actual discs and the difference between the drives that are used. These beta target values are therefore not very accurate.

For this reason, two different problematic effects can occur. The first is an effect called the post heat effect and this effect increases with increasing write power. This jitter effect is manifested in partly collapsing written marks on the disc as the pits and the lands interact with each other on the disc. This jitter effect therefore increases with increasing speed. Due to this jitter effect the regulation direction based on beta could be wrong, which would increase the jitter and Bler parameters and which would result in an undesired write performance.

The second problem is that non-OPC beta target values for non-OPC speeds are not very accurate. For some writing profiles including CAV, the beta target values for in-between speeds are determined based on estimations. This means that write power determination/regulation will be more difficult and may result in a non-appreciated write performance.

There is thus a need to overcome the issue of shortcuts becoming less relevant.

SUMMARY OF THE INVENTION

The present invention relates to determining an optimized write power used for writing electronic data on an optical disc.

This is achieved by using a write power determining model including detected signals from written parts of the optical disc.

A first object of the present invention is to provide a write power determining model including detected signals from written parts of the optical disc.

According to a first aspect of the present invention, this object is achieved by a method for determining a write power for writing electronic data on a medium, based on a sequence of written data, using a power control model including a written data deviation measure, a written data asymmetry and a written data asymmetry target value, the method comprising the steps of determining the written data deviation measure for the sequence of written data, adjusting the written data asymmetry target value in relation to the written data asymmetry if the written data deviation measure has changed, determining the write power in dependence on written data asymmetry, and writing another sequence of data on the medium using said determined write power, so as to obtain power-optimized writing of data.

A second object of the present invention is to provide a device based on using the write power determining model including detected signals from written parts of the optical disc.

According to a second aspect of the present invention, this object is achieved by a device for determining a write power for writing electronic data on a medium, based on a sequence of written data, using a power control model including a written data deviation measure, a written data asymmetry and a written data asymmetry target value, the device comprising a read/write unit arranged to detect optical signals from the medium and write electronic data on the medium, a control unit arranged to determine a deviation measure of the written data, adjust the written data asymmetry target value in relation to the written data asymmetry if the written data deviation measure has changed, and to determine the write power in dependence on written data asymmetry, and a power unit, arranged to supply the determined write power to the read/write unit, so as to obtain power-optimized writing of data.

A third object of the present invention is to provide a computer program product using the write power determining model including detected signals from written parts of the optical disc.

According to a third aspect of the present invention, this object is achieved by a computer program product for making a computer, when said computer program product is loaded in the computer, determine a written data deviation measure for a sequence of written data in which the data are electronic data written on a medium, within a power control model including the written data deviation measure, a written data asymmetry and a written data asymmetry target value, adjust the written data asymmetry target value in relation to the written data asymmetry if the written data deviation measure has changed, determine the write power in dependence on written data asymmetry, and enable writing of another sequence of data on the medium using said determined write power, so as to obtain power-optimized writing of data.

The present invention has the following advantages:

The invention provides determination of an optimized write power, which enables high-speed writing of electronic data on an optical medium.

Another advantage of the invention is that the determination of optimized write power takes into account a written data deviation measure, for the adjusting of a written data asymmetry target value, which enables the high-speed writing of electronic data on an optical medium to be faultless.

Direction of the independent claims and the advantages thereof:

Claim 2 is directed towards a repetitive determination of the write power. This claim has the advantage of enabling a write power determination based on optical properties of a disc detected at successive moments.

Claims 3-5 are directed toward adjusting the written data asymmetry target value. These claims have the advantage of taking into account an increase in the written data deviation measure.

Claims 6-8 are directed to the written data deviation measure and to which the measure is related. This is advantageous since the written data deviation measure can be dependent on the jitter of the written data, and can be dependent on an error rate of the written data.

Claim 9 is directed towards determining the written data asymmetry, which is advantageous since this measure is linear with respect to the write power and is used in the determination thereof.

Claims 10, 11, 12 and 15, are directed toward adjusting the written data target value if a difference between the written data asymmetry target value and a written data asymmetry value has changed consistently at at least two consecutive moments. This is advantageous since the target value is changed in dependence on a trend-like change in the difference found.

Claims 13 and 14, and 16 and 17, are directed towards decreasing and increasing, respectively, the written data asymmetry target value by an amount that depends on a difference between differences between the written data asymmetry target value and a written data asymmetry value, detected at two different moments. This has the advantage of taking into account a behaviour over successive moments.

Claim 18 is directed towards determining the write power in dependence on the difference between the written data asymmetry target value and the written data asymmetry.

Claim 19 is directed towards determining the overspeed factor of the medium. This is advantageous since the asymmetry target value is dependent on the overspeed factor.

BRIEF DESCRIPTION OF THE DRAWINGS

The present invention will now be described in more detail in relation to the appended drawings, in which.

DESCRIPTION OF PREFERRED EMBODIMENTS

The invention relates in general to writing electronic data on optical discs, and in particular to writing such data using an optimized write power.

Writing of electronic data on an optical medium at a high rotational speed is a challenging task.

Due to local disc variations, high-speed writing at the outside, that is, the outer regions, of the discs makes great demands on the disc drive and its ability to determine an accurate write power, especially for CAV writing for which the linear velocity increases with increasing distance from the center of the disc.

In order to determine a preferable write power, regulation of optical parameters determined on the basis of detected signals, is utilized. Here the regulation comprises determining the jitter ($\sigma$) or Block error rate (Bler) parameters as examples of written data deviation measures, and the written data asymmetry parameter beta ($\beta$) for a certain so-called disc overspeed factor Nx, on which parameters the power determination depends.

The disc overspeed factor (Nx) related to the linear velocity at a certain position of the disc according to equation 6 is:

$$Nx = \frac{2 \cdot \pi \cdot f_m \cdot R}{v_{1x}}, \quad (6)$$

wherein $f_m$ is the rotation frequency of the disc drive motor, R is the disc radius, and $v_{1x}$ the linear velocity at 1x speed. One example of the linear velocity at 1x speed is $v_{1x}=3.49$ m/s for DVD discs.

As written data asymmetry parameter beta ($\beta$) is linear with respect to power, in contrast to jitter and Bler, which are parabolic, beta is used to determine which direction the write power must be changed in, in order to decrease elevated jitter or Bler parameter values during regulation.

For the purpose of detecting high jitter or Bler values, due to post heat effects and erroneously written data asymmetry target values such as beta target values, a new walking optimal power control (WOPC) procedure based on values of determined parameters, which are calculated based on detected signals of written data, is proposed. Information from previously performed WOPCs are stored in a table. If at least two consecutive increases of jitter or Bler, i.e. the examples of written data deviation measures, have been assessed, it is assumed that the power regulation based on the asymmetry beta is wrong. If also delta beta, that is, the beta target value minus the determined beta value, has two consecutive increases or decreases, the beta target value is changed. Since the power is dependent on the beta target, a change of beta target value affects the write power and changes in a favorable direction.

Figure 1:
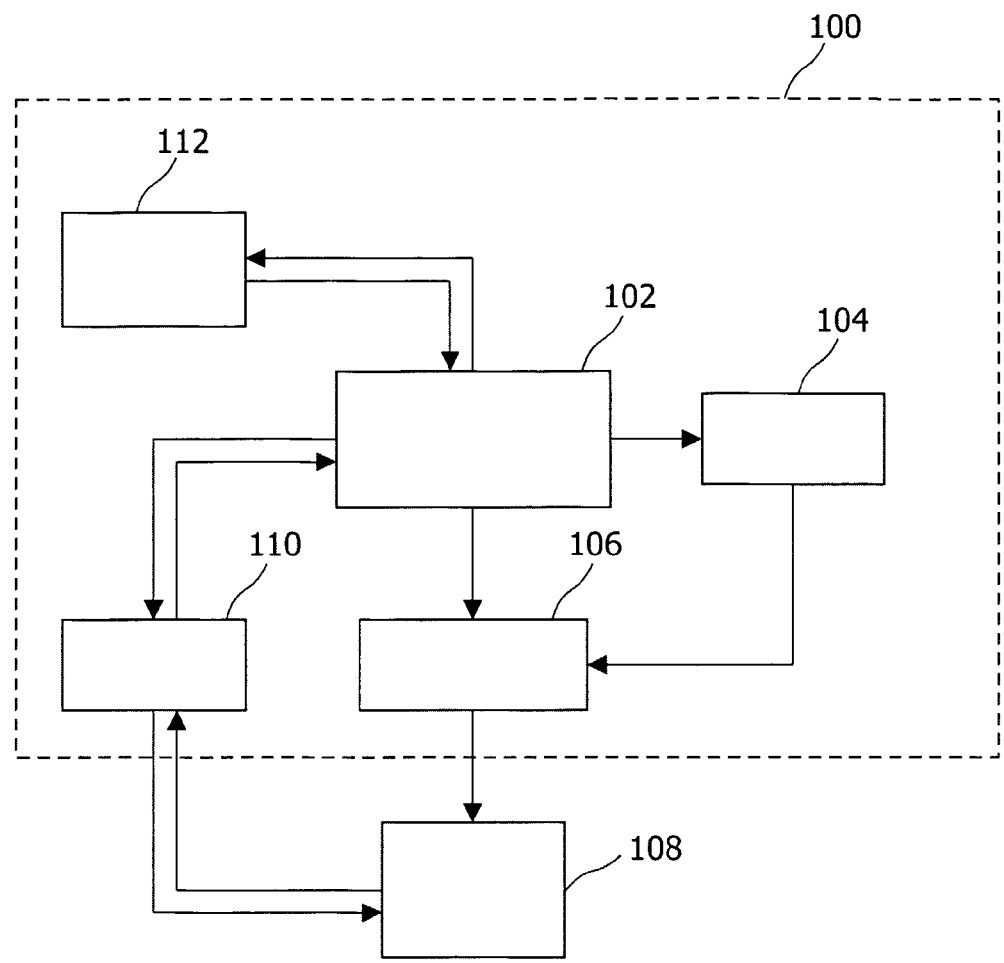
FIG. 1 is a schematic representation of a device according to a preferred embodiment of the present invention.
Figure 3:
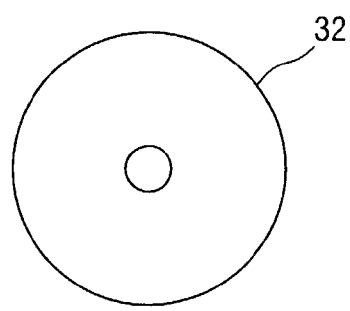
FIG. 3 shows a computer program product according to preferred embodiment of the present invention.

According to one embodiment of the present invention, a device for determining a write power when writing electronic data on a medium, is schematically presented in FIG. 1. The device 100 comprises a control unit 102, which controls the determination of the write power. The power unit 104 is thus connected to the control unit 102. The power unit 104 supplies a writing unit 106 with power under the control of the control unit 102 to which the writing unit 106 is connected. The control unit 102 is further connected to a detecting unit 110, which is arranged to detect various optical parameters from an electronic medium 108. In a preferred embodiment this optical medium is of the type of a digital versatile disc (DVD). The writing unit 106 is arranged to write electronic data on the DVD disc. In a preferred embodiment of the present invention the device for determining the write power 100 is also equipped with a memory unit 112, which is connected to the control unit 102. This memory unit 112 is used as a storage facility of detected optical parameters during successive optical parameter detections.

The present invention relates to determining a write power which uses successive sequences of electronic data to determine an optimized write power. First, the writing unit writes a sequence of electronic data on the DVD disc. During a subsequent session at one moment in time S the detector determines various optical properties of the sequence of written data. Based on these detected properties of the written data at local positions of the optical DVD disc, the device determines an updated write power to be used for writing a next sequence of electronic data. After having written this next sequence, the detector detects the optical parameters of the sequence written last at the new local position of the DVD disc. The device now determines a new updated write power based on the new detected optical parameters. As the disc properties of the optical disc change from the inside to the outside of the disc, it is preferable to monitor the optical parameters of written data effected by these changes in disc properties, in order to optimize the write power.

Figure 2A:
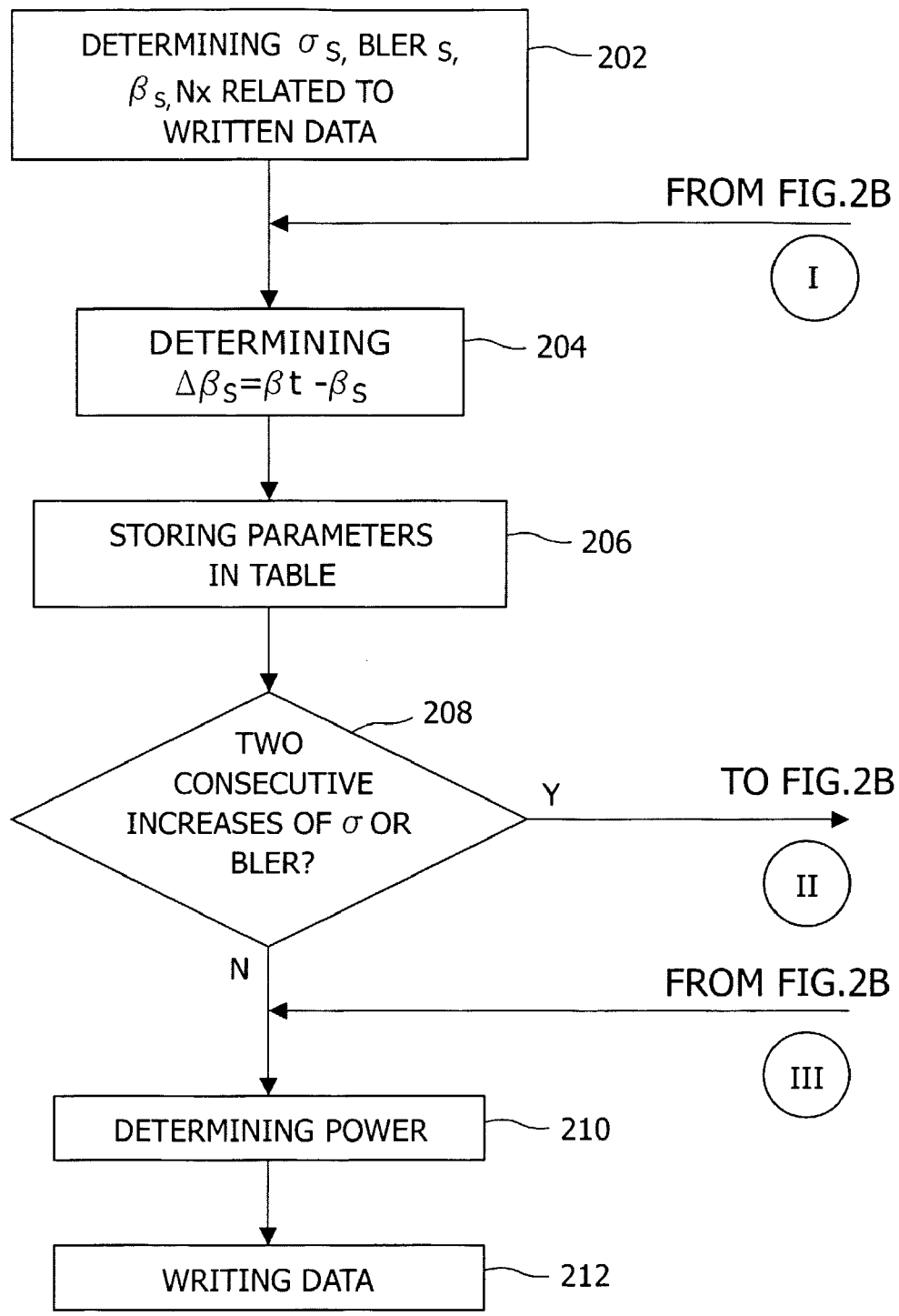
FIGS. 2A and 2B present a flowchart of a method according to a preferred embodiment of the present invention.
Figure 2B:
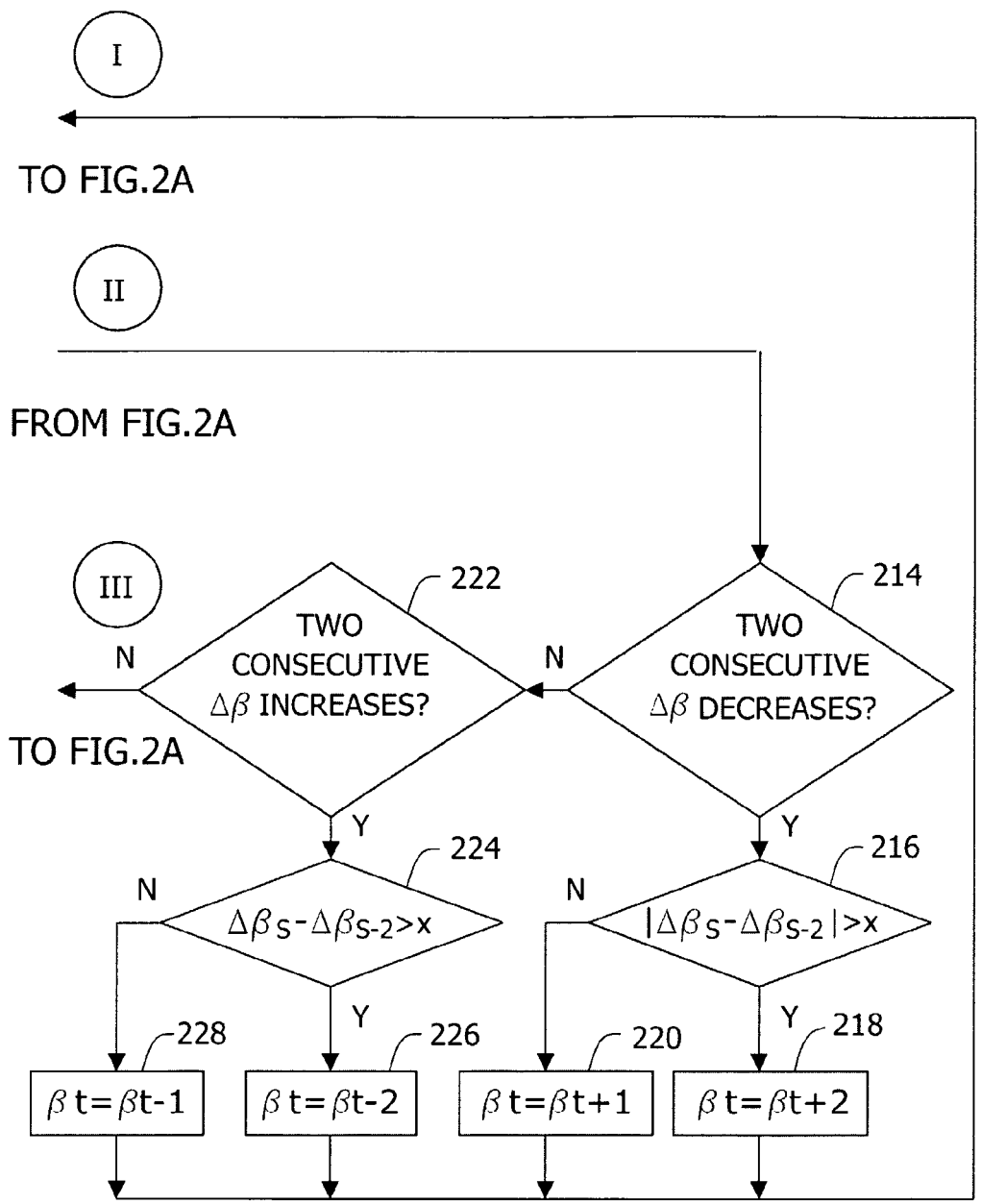

With reference to FIGS. 2A and 2B, a flow chart of a method for determining a write power according to a preferred embodiment of the present invention will now be presented.

In short, a first sequence of electronic data is written on the DVD as one type of optical medium. After each such written data sequence, follows a session or moment during which the detector detects various optical properties of the last written data sequence. Each such session is referred to as S, and S begins with S=0. Writing a second sequence and detecting optical parameters related to the second sequence thus provides parameters with S=1.

According to a preferred embodiment of the present invention, the method for determining a write power for writing electronic data on a medium, based on a sequence of written data, starts by determining the optical parameters jitter ($\sigma_S$), block error rate ($Bler_S$), beta ($\beta_S$), and overspeed factor (Nx) related to the written data, step 202. These optical parameters are determined by the control unit 102 based on optical signals detected by the detecting unit 110 from the DVD disc 108.

According to one embodiment of the present invention the detecting unit 110 is a unit separate from the writing unit 106. In another embodiment of the present invention this detecting unit 110 and the writing unit 106 are located within one common read/write unit.

The subscript S thus denotes the particular session following the sequence of written data to which the detected optical parameters are associated.

Next step of the method for determining the write power is determining the beta difference $\Delta\beta_S$ following equation 7, $$\Delta\beta_S = \beta t - \beta_S \quad (7)$$

where $\beta t$ is a beta target value and $\beta_S$ the beta of the written data determined during session S, step 204.

According to a preferred embodiment of the present invention, the parameters determined in step 204, that is the jitter ($\sigma_S$), block error rate ($Bler_S$), beta ($\beta_S$), and overspeed factor (Nx) related to the written data, are stored in a table, step 206, for the current session referenced, S.

According to one embodiment of the present invention, the method now includes step 208, concluding whether at least two consecutive increases of jitter ($\sigma$) or block error rate (Bler) have been detected or not. This step is performed by the control unit 102 based on the optical parameters stored in the memory unit 112. If the control unit 102 now detects two consecutive increases of jitter or Bler, the control unit 102 of the device now determines whether two consecutive decreases of $\Delta\beta$ have been calculated, step 214, again based on the parameters stored in the memory unit 112. In case the control unit 102 detects two consecutive decreases of $\Delta\beta$, the control unit 102 now determines the difference between the detected $\Delta\beta$ for session S and the $\Delta\beta$ for session S−2 and whether the absolute value of said difference is greater than an amount x or not, step 216. The control unit 102 thus calculates whether $|\Delta\beta_s - \Delta\beta_{S-2}|$ is greater than x. In case the difference between the beta differences is detected to be greater than x, the target value of the asymmetry $\beta t$ is increased by the control unit 102. According to a preferred embodiment of the present invention the target value $\beta t$ is increased by 2, as an example of a suitable value, step 218. If, on the other hand, the control unit concludes that the difference between the two beta differences $|\Delta\beta_s - \Delta\beta_{S-2}|$ detected for the sequence S and S−2, respectively, in step 216, is not greater than x, the control unit increases the target value by a smaller value. According to a preferred embodiment of the present invention the target value βt is now increased by 1, as an example of a value smaller than 2 in step 220.

If the control unit 102 concludes that Δβ has not decreased two times in a row in step 214 the control unit 102 decides whether the detected Δβ values for S and S−1 are consistent with two consecutive increases of Δβ or not, step 222. The control unit 102 thus concludes whether $\Delta\beta_S > \Delta\beta_{S-1}$ and $\Delta\beta_{S-1} > \Delta\beta_{S-2}$ or not by retrieving the appropriate values from the memory unit 112 and using the stored values of Δβ for the different sessions S. If the control unit 102 concludes that the Δβ has increased twice in a row in step 222, the control unit 102 now determines whether the difference between two beta differences $\Delta\beta_S - \Delta\beta_{S-2}$ detected for the session S and S−2, respectively, is greater than x or not in step 224.

In case the control unit 102 concludes that the difference detected in step 224 is greater than x, the control unit decreases the beta target value βt, step 226. According to a preferred embodiment of the present invention the target value βt is here decreased by 2 as an example of a suitable value. Similarly, in case the control unit 102 concludes that the difference as determined in step 224 is not greater than x, the beta target value is decreased and now by 1 according to a preferred embodiment of the present invention, step 228, as an example of a value smaller than 2.

Subsequent to the steps of adjusting the target value, steps 218, 220, 226 and 228, an updated $\Delta\beta_S$ value is calculated in step 204 by the control unit 102 by the use of the updated target value βt, as detected in any one of steps 218, 220, 226 or 228. The determination of the updated $\Delta\beta_S$ value, which is to enable updating the write power during the current session number S, and is clarified below. Prior to recalculating the $\Delta\beta_S$, a βt updated flag βu is set to 1. The default value of this flag βu, indicating whether βt has been updated or not, is 0.

After the control unit 102 has calculated the updated $\Delta\beta_S$ value, this updated value is stored in the table in the memory unit 112 by overwriting the old $\Delta\beta_S$ value, since the $\Delta\beta_S$ value has been updated for an unchanged session number S.

In step 208, the control unit concludes whether two consecutive increases of jitter or Bler have been detected or not, only in case βu equals 0. In this case, after the βt value has been updated, the βu is 1, the control unit will not perform the jitter or Bler detection. Neither will the control unit conclude this if said control control unit has not assessed two consecutive increases of jitter and Bler.

The method according to a preferred embodiment of the present invention, now includes the step of determining the write power, step 210, performed by the control unit. As indicated above, the updated βt parameter affects the Δβ value according to the relationship $\Delta\beta = \beta t - \beta_S$. As the write power further is dependent on the Δβ, the change in beta target affects the power. A detailed description of a calculation of the write power will follow below.

Subsequent to step 210, having determined the updated write power, a new sequence of electronic data is written on the DVD in step 212 to achieve an improved read and write performance of the optical disc. The step further comprises incrementing the session number S by unity (S=S+1) and resetting the beta updated flag βu to 0.

As the step of determining the write power is central to the present invention, this step will now be explained in more detail.

The write power, denoted by α, is updated by adding a power correction $\Delta\alpha_{Nx}$ determined for a certain rotation overspeed factor Nx according to equation 8.

$$\alpha = \alpha + \Delta\alpha_{Nx} \quad (8)$$

Now, from OPC, at a certain speed, the relationship between power (step) and beta (step), assuming a linear behaviour looks like:

$$\alpha = \frac{\delta\alpha}{\delta\beta} \cdot \beta + \alpha_0 \quad (9)$$

For other speeds, that is non-OPC speeds, the slope $\delta\alpha/\delta\beta$ is assumed to be the same.

During the process of writing electronic data to a disc, after a sequence of data is written, the writing process is stopped and a session of determining the write performance of the optical disc by determining the optical properties follows. The beta is measured and compared with a beta target for a certain speed Nx according to equation 10.

$$\Delta\beta_{wopc} = \beta t_{Nx} - \beta_{measured} \quad (10)$$

The power change Δα can thus be calculated using equation 11 for an OPC-speed.

$$\Delta\alpha = \frac{\delta\alpha}{\delta\beta} \cdot \Delta\beta_{wopc} \quad (11)$$

For non-OPC Nx speeds, assuming the relative power change to be the same, the power change can be determined using equation 12.

$$\Delta\alpha_{Nx} = \frac{\delta\alpha}{\delta\beta} \cdot \Delta\beta_{wopc} \cdot \frac{\alpha_{Nx}}{\alpha_{Nopc}} \quad (12)$$

where $\alpha_{Nx}$ equals the power used for the speed Nx and $\alpha_{Nopc}$ and the power used at the OPC-speed Nopc. The quota $\alpha_{Nx}/\alpha_{Nopc}$ is thus a speed correction quota.

Thus the power step $\Delta\alpha_{Nx}$ to be added to the previously used power, α, following equation 8, is thus determined.

The table in which information from each WOPC is stored, can be designed as shown below in Table 1, being an example of many possible tables for CAV writing.

TABLE 1

| Session No., S (WOPC No.) | $\Delta\beta_S$ | $\sigma_S$ | $Bler_S$ | Nx | $\beta t_{min}$ |
|---|---|---|---|---|---|
| 0 | $\Delta\beta_0$ | $\sigma_0$ | $Bler_0$ | Nx1 | $\beta t_{min\_Nx1}$ |
| 1 | $\Delta\beta_1$ | $\sigma_1$ | $Bler_1$ | Nx2 | $\beta t_{min\_Nx1}$ |
| 2 | $\Delta\beta_2$ | $\sigma_2$ | $Bler_2$ | Nx3 | $\beta t_{min\_Nx1}$ |
| 3 | $\Delta\beta_3$ | $\sigma_3$ | $Bler_3$ | Nx4 | $\beta t_{min\_Nx4}$ |
| 4 | $\Delta\beta_4$ | $\sigma_4$ | $Bler_4$ | Nx5 | $\beta t_{min\_Nx4}$ |
| ... | ... | ... | ... | ... | ... |
| n − 1 | $\Delta\beta_{n-1}$ | $\sigma_{n-1}$ | $Bler_{n-1}$ | Nxn | |

As seen in Table 1, for each session number (=WOPC number), the $\Delta\beta_S$ is calculated according to equation 7 presented above, the jitter, $\sigma_S$ and the Block Error Rate $Bler_S$ are determined. Also, the overspeed factor Nx is included for each WOPC No., S.

Now, for CAV writing the beta target is made dependent on the disc speed. If the beta target value is changed during a WOPC, that is, any one of steps 218, 220, 226 and 228 have been passed, this new beta target is included in Table 1 as the minimum beta target to be used subsequently. As the beta target is dependent on the overspeed factor and the overspeed factor is increasing for CAV, the beta target is made to increase accordingly. The minimum value is thus the latest determined beta target value. The value of beta target at overspeed factor Nx, $\beta t_{Nx}$ is calculated using equation 13:

$$\beta t_{Nx} = \beta t_{min\_Nx} + \frac{(Nx_{Ns} - Nx_{min\_new})}{(Nx_{max} - Nx_{min\_new})} \cdot (\beta t_{Nx\_max} - \beta t_{min\_Nx}) \quad (13)$$

wherein $\beta t_{min\_Nx}$ is the beta target that was changed last during WOPC, $Nx_{Ns}$ the overspeed factor of the actual position Ns, $Nx_{min\_new}$ the overspeed factor at which beta target was changed, $Nx_{max}$ the maximum overspeed factor determined from OPC at the outside of the disc, and $\beta t_{Nx\_max}$ the corresponding beta target at the maximum speed at the outside of the disc.

In Table 1 above it is seen that the $\beta t_{min}$ for S=3 is $\beta t_{min-Nx4}$, whereas it is $\beta t_{min\_Nx1}$ for S=0, 1 and 2. The $\beta t_{min}$ value, has thus changed, reporting that the βt value changed during WOPC at S=3.

If the beta target is changed during an WOPC of already written electronic data, linear interpolation will thus be performed between the "new beta target", that is $\beta t_{min\_Nx}$, and the outside beta target $\beta t_{Nx\_max}$ as determined by the outside OPC.

By the linear interpolation as described above, an overspeed-factor dependence of the beta target is obtained. Also, the correction of the beta target during WOPC and the linear interpolation of the beta target together provide a beta target value for the method according to the preferred embodiment of the present invention.

The computer program product is provided as a CD-ROM disc according to a preferred embodiment of the present invention. However, the computer program product can alternatively be provided on another type of disc such as a DVD disc, a hard disc, an MD disc, or be provided in a memory or in another storage capacity.

The control unit in the device for determining a write power when writing electronic data on a medium is normally realized as a processor with connected computer program memory. The memory unit may be incorporated within the program memory but may also be realized as a separate computer memory.

It is emphasized that this invention can be varied in many more ways, of which the alternative embodiments below are only examples of a few. These different embodiments are hence non-limiting examples. The scope of the present invention, however, is only limited by the claims that follow.

According to another embodiment of the present invention the control unit concludes only whether the jitter has increased consecutively or not in step 208.

According to another embodiment of the present invention the jitter, as the only written data deviation measure, is determined by the control unit in step 202.

According to yet another embodiment of the present invention the control unit concludes only whether the Bler has increased consecutively or not in step 208.

According to another embodiment of the present invention the Bler, as the only written data deviation measure, is determined by the control unit in step 202.

According to another embodiment of the present invention the Bit Error Rate (BER), as another example of a written data deviation measure, is determined in step 202, after which the control unit concludes whether the BER has increased two times in a row or not in step 208.

According to yet another embodiment of the present invention the control unit concludes whether the jitter or Bler has increased more than two times in a row or not in step 208.

As mentioned earlier, in an alternative embodiment there is concluded whether jitter and Bler have increased two times in a row, in step 208.

According to yet another embodiment of the present invention the written data deviation measure that is determined is related to the jitter, but is not the jitter as such. As the jitter value is not used as such in the calculation, the value does not have to be determined, but a value that is dependent thereof is sufficient in step 208.

According to yet another embodiment of the present invention the written data deviation measure that is determined is related to the Bler, but is different from the Bler as such. As the Bler value is not used as such in the calculation, another value that is dependent on the Bler is determined and is used instead of the Bler value to enable the control unit to conclude whether Bler has increased or not in step 208.

According to yet another embodiment of the present invention the steps in the method as presented in FIGS. 2A and 2B may be performed in a different order.

According to yet another embodiment of the present invention the steps of concluding whether delta beta has decreased two times in a row or not, in step 214, or whether delta beta has increased two times in a row or not in step 222, include determinations whether delta beta has increased or decreased more than two times in a row.

According to still another embodiment of the present invention the method according to the invention may include a step of determining the difference between the delta beta at a first session or moment and the delta beta detected at a second session, where the two sessions are three or more sessions apart.

According to still another embodiment of the present invention the threshold values as included in steps 216 and 224 are different relative to one another.

According to still another embodiment of the present invention two different thresholds are introduced in each one of steps 216 and 224. It is then concluded whether the calculated difference is lower than both thresholds, in between the two thresholds or higher than both thresholds. In this connection three different beta target updating values are proposed for the updating of the beta target.

As an alternative to the embodiments of the present invention mentioned above, another embodiment is proposed in which the updated beta target after steps 218, 220, 226 and 228 are not used in the recalculation of the delta beta for the current moment or session S, but which updated beta target values are used in the following session S+1, during which delta beta is determined in step 204.

According to still another embodiment of the present invention the write power correction, as determined in step 210, is a product of the Nx/Nopc quota.

The invention claimed is:

1. A method for determining a write power, for writing electronic data on a medium (32,108), based on a sequence of written data, using a power control model including a written data deviation measure, a written data asymmetry and a written data asymmetry target value, comprising the steps of:
   determining the written data deviation measure for the sequence of written data (step 202),
   adjusting the written data asymmetry target value in relation to the written data asymmetry if the written data deviation measure has changed (steps 218,220,226,228), determining the write power in dependence in written data asymmetry (step 210), and writing another sequence of data on the medium using said determined write power (step 212), so as to obtain power-optimized writing of data.

2. The method according to claim 1, in which steps are performed at repetitive moments after writing each data sequence on the medium (32,108).

3. The method according to claim 2, in which the adjusting step includes adjusting the written data asymmetry target value if the deviation measure has increased consistently at at least two consecutive repetitive moments (steps 208,218,220, 226,228).

4. The method according to claim 1, in which the adjusting step includes adjusting the written data asymmetry target value if the deviation measure has increased (steps 208,218, 220,226,228).

5. The method according to claim 1, in which the adjusting step includes adjusting the written data asymmetry target value if the deviation measure has an increasing trend (steps 208,218,220,226,228).

6. The method according to claim 1, in which the written data deviation measure is at least related to the jitter of the written data.

7. The method according to claim 1, in which the written data deviation measure is at least related to an error rate of the written data.

8. The method to claim 7, in which the error rate is the block error rate of the written data.

9. The method according to claim 1, further comprising the step of:

determining the written data asymmetry (step 202).

10. The method according to claim 9, in which the adjusting step includes adjusting the written data asymmetry target value in dependence on the difference between the written data asymmetry and the written data asymmetry target value (steps 214,222).

11. The method according to claim 10, in which the adjusting step includes adjusting the written data asymmetry target value if the difference between the written data asymmetry and the written data asymmetry target value has changed in a consistent direction at at least two consecutive repetitive moments (steps 214,222).

12. The method according to claim 11, in which the adjusting step includes increasing the written data asymmetry target value if the difference between the written data asymmetry and the written data asymmetry target value has decreased consistently at at least two consecutive repetitive moments (step 214).

13. The method according to claim 12, in which the adjusting step includes increasing the written data asymmetry target value by a first value if the difference between the written data asymmetry and the written data asymmetry target value detected at one moment, has decreased by more than a second value (step 218) relative to the difference between the written data asymmetry and the written data asymmetry target value, determined two moments earlier.

14. The method according to claim 12, in which the adjusting step includes increasing the written data asymmetry target value by a first value if the difference between the written data asymmetry and the written data asymmetry target value, detected at one moment, has decreased by less than a second value (step 220) relative to the difference between the written data asymmetry and the written data asymmetry target value, detected two moments earlier.

15. The method according to claim 11, in which the adjusting step, includes decreasing the written data asymmetry target value if the difference between the written data asymmetry and the written data asymmetry target value has increased consistently at at least two consecutive repetitive moments (step 224).

16. The method according to claim 15, in which the adjusting step, includes decreasing the written data asymmetry target value by a first value if the difference between the written data asymmetry and the written data asymmetry target value detected at one moment, has increased by more than a second value (step 226) relative to the difference between the written data asymmetry and the written data asymmetry target value detected two moments earlier.

17. The method according to claim 15, in which the adjusting step, includes decreasing the written data asymmetry target value by a first value if the difference between the written data asymmetry and the written data asymmetry target value, detected at one moment, has increased by less than a second value (step 228) relative to the difference between the written data asymmetry and the written data asymmetry target value detected two moments earlier.

18. The method according to claim 1, in which determining the write power, includes determining the write power in dependence on the difference between the written data asymmetry target value and the written data asymmetry (step 210).

19. The method according to claim 1, further comprising the step of determining the overspeed factor of the medium, and in which the step of determining the write power entails determining the write power in dependence on the determined overspeed factor of the medium (step 202).

20. A device (100) for determining a write power when writing electronic data on a medium (32,108), based on a sequence of written data, using a power control model including a written data deviation measure, a written data asymmetry and a written data asymmetry target value, the device comprising:

a read/write unit (106,110), arranged to detect optical signals from the medium (32,108), and write electronic data on the medium (32,108), a control unit (102), arranged to determine a deviation measure of the written data (step 202), adjust a written data asymmetry target value in relation to the written data asymmetry, if the written data deviation measure has changed (steps 218,220,226,228), and to determine the write power in dependence on written data asymmetry (step 210), and a power unit (104), arranged to supply the determined write power to the read/write unit (106,110), so as to obtain power-optimized writing of data.

21. Computer program embodied in a computer readable medium for controlling a processor of a computer to operate the computer, the program comprising:

means for determining a written data deviation measure for a sequence of electronic data written on d medium (32, 108,step 202), within a power control model including the written data deviation measure, a written data asymmetry and a written data asymmetry target value, means for adjusting the written data asymmetry target value in relation to the written data asymmetry if the written data deviation measure has changed (steps 218, 220,226,226), means for determining the write power in dependence on written data asymmetry (step 210), and means for enabling the writing of another sequence of data on the medium (32,108) using said determined write power, so as to obtain power-optimized writing of data.

* * * * *